F. WASHBOURNE.

Improvement in Screws.

No. 5,125. Reissued Oct. 29, 1872.

Witnesses:
Alex F. Roberts
Frank Blockley

Inventor:
F. Washbourne
PER
Munn & Co.
Attorneys.

AM. PHOTO-LITHOGRAPHIC CO. N.Y. (OSBORNE'S PROCESS.)

UNITED STATES PATENT OFFICE.

FRANK WASHBOURNE, OF NEW YORK, N. Y.

IMPROVEMENT IN SCREWS.

Specification forming part of Letters Patent No. 84,663, dated December 1, 1868; reissue No. 5,125, dated October 29, 1872.

*To all whom it may concern:*

Be it known that I, FRANK WASHBOURNE, of the city, county, and State of New York, have invented a new and useful Improvement in Screws, of which the following is a specification:

Bib-screws are now made by casting them, head and shank, in one piece; but screws so made are brittle and liable to be easily broken, and a large percentage of metal is wasted in their manufacture. In addition to these disadvantages their appearance is rough and coarse compared with such as are made of wrought metal according to my invention, whereas my improved screws are of superior toughness and strength, and capable of more wear, and are less liable to break than those that are cast in one piece.

My improvement consists in so making the slot across the head of a screw made in two parts as to its head and shank that in turning the screw with a screw-driver the implement will take hold of the slot in the shank, and consequently the liability of wrenching off the head will be avoided.

I will now proceed to describe one of the ways or methods by which I carry out my invention.

Figure 1:
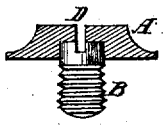
Figure 2:
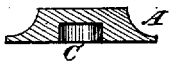
Figure 3:
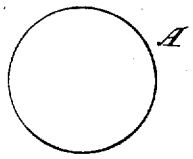
Figure 4:
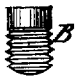

Referring to the drawing, Figure 1 is an axial section of a bib-screw made according to my invention. Fig. 2 is a cross-section of the head as it appears after it is brought to the required shape and before it is united to the shank of the screw. Fig. 3 is a plan view of the blank from which the head is struck up. Fig. 4 is a detailed view of the shank.

Similar letters of reference indicate corresponding parts.

In Fig. 1 I have shown a bib-screw made according to my invention, and in Fig. 2 I have shown a detailed sectional view of the head only before it is slotted. The said head, when made of wrought metal, is formed or cut out in the first place to the shape of the blank shown in Fig. 3, and is afterward brought to the form shown in Fig. 2 by suitable dies or formers, a recess, C, being in the same operation formed in the under side in a central position to receive the top of the shank B. The blank from which the shank B is formed is attached to the head by inserting one end in the recess C and soldering or brazing it to the head. The screw-thread is formed on the shank after it is united to the head, but it may be formed previously, if preferred. After the head and shank are firmly united to each other I cut a slot, D, across the top of the head to receive the end of a screw-driver, and I sink said slot until it enters the upper end of the shank B a sufficient distance to enable the screw-driver to take hold of the shank.

Having thus described my invention, I claim as new and desire to secure by Letters Patent—

As an improved article of manufacture, a screw having its head and shank made in separate pieces and slotted, substantially as described, so that in turning the screw with a screw-driver the implement will take hold of the slot in the shank.

FRANK WASHBOURNE.

Witnesses:
T. B. MOSHER,
ALEX. F. ROBERTS.